US010200348B2

United States Patent
Vanore et al.

(10) Patent No.: US 10,200,348 B2
(45) Date of Patent: Feb. 5, 2019

(54) METHOD TO DETECT AN OTA (OVER THE AIR) STANDARD MESSAGE AFFECTED BY AN ERROR

(71) Applicant: STMicroelectronics S.r.l., Agrate Brianza (IT)

(72) Inventors: Agostino Vanore, San Marco Evangelista (IT); Vitantonio Di Stasio, Caserta (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 15/621,762

(22) Filed: Jun. 13, 2017

(65) Prior Publication Data

US 2017/0310646 A1  Oct. 26, 2017

Related U.S. Application Data

(63) Continuation of application No. 14/524,132, filed on Oct. 27, 2014, now Pat. No. 9,705,853.

(30) Foreign Application Priority Data

Nov. 4, 2013  (IT) .............................. MI2013A1824

(51) Int. Cl.
*H04L 29/06* (2006.01)
*H04W 4/50* (2018.01)
(Continued)

(52) U.S. Cl.
CPC ............ *H04L 63/0435* (2013.01); *H04L 9/14* (2013.01); *H04W 4/50* (2018.02); *H04W 4/60* (2018.02); *H04W 12/04* (2013.01); *H04W 12/08* (2013.01); *H04W 12/10* (2013.01); *H04L 63/123* (2013.01); *H04L 63/1475* (2013.01);
(Continued)

(58) Field of Classification Search
CPC ............... H04L 63/0435; H04L 63/123; H04L 63/1475; H04L 9/14; H04L 2209/20; H04L 2209/34; H04L 2209/80; H04W 4/60; H04W 4/50; H04W 4/001; H04W 4/003;
(Continued)

(56) References Cited

U.S. PATENT DOCUMENTS 5,832,083 A  11/1998  Iwayama et al.
7,188,250 B1 * 3/2007  Alfieri ....................... H04L 9/06
                                                                713/161
(Continued)

OTHER PUBLICATIONS

Kent, S. et al., "IP encapsulating security payload (ESP) rfc2406. txt," Nov. 1998, 23 pages.
(Continued)

*Primary Examiner* — Sarah Su
(74) *Attorney, Agent, or Firm* — Slater Matsil, LLP

(57) ABSTRACT

A method is to detect a message compatible with the OTA (Over The Air) standard and affected by a wrong ciphering. The method may include receiving the ciphered OTA message; deciphering the OTA message; and reading a counter field of padding bytes in the deciphered OTA message and reading corresponding padding bytes in the OTA message deciphered. The method may also include detecting at least one bit in at least one of the padding bytes of the OTA message deciphered, with the at least one bit being indicative of the wrong ciphering.

21 Claims, 2 Drawing Sheets

(51) Int. Cl.

| | |
|---|---|
| *H04W 4/60* | (2018.01) |
| *H04W 12/10* | (2009.01) |
| *H04W 12/08* | (2009.01) |
| *H04L 9/14* | (2006.01) |
| *H04W 12/04* | (2009.01) |
| *H04W 12/12* | (2009.01) |

(52) U.S. Cl.
CPC ...... *H04L 2209/20* (2013.01); *H04L 2209/34* (2013.01); *H04L 2209/80* (2013.01); *H04W 12/12* (2013.01)

(58) Field of Classification Search
CPC ..... H04W 12/04; H04W 12/08; H04W 12/10; H04W 12/12
See application file for complete search history.

(56) References Cited

U.S. PATENT DOCUMENTS

| | | | |
|---|---|---|---|
| 7,221,660 B1 | 5/2007 | Simonson et al. | |
| 7,882,350 B2* | 2/2011 | Lelegard | H04N 7/1675 |
| | | | 380/274 |
| 9,608,815 B2* | 3/2017 | Kubota | H04L 9/12 |
| 2003/0188247 A1 | 10/2003 | Ahmed et al. | |
| 2005/0018853 A1* | 1/2005 | Lain | H04L 9/0836 |
| | | | 380/277 |
| 2006/0154695 A1 | 7/2006 | Ishibashi | |
| 2007/0091886 A1 | 4/2007 | Davis et al. | |
| 2007/0140259 A1 | 6/2007 | Mouffron et al. | |
| 2009/0055893 A1 | 2/2009 | Manessis et al. | |
| 2009/0138948 A1 | 5/2009 | Calamera et al. | |
| 2009/0222708 A1 | 9/2009 | Yamaga | |
| 2010/0332933 A1 | 12/2010 | Kubota | |
| 2011/0103445 A1 | 5/2011 | Jax et al. | |
| 2014/0079213 A1* | 3/2014 | Jacobson | H04L 63/123 |
| | | | 380/28 |
| 2014/0372758 A1 | 12/2014 | Agiwal et al. | |
| 2015/0382238 A1* | 12/2015 | Davis | H04W 28/06 |
| | | | 370/389 |

OTHER PUBLICATIONS

"Smart Cards; Secured packet structure for UICC based applications (Release 11)", Technical Specification, European Telecommunications Standards Institute (ETSI), vol. SCP TEC, No. V11.0.0, Mar. 2012, 22 pages.

"U(SIM) Application Toolkit Attack," Source: Research in Motion UK Ltd, Document for: Discussion and Decision, Agenda Item: 7.11, Work Item/Release: SEC11, 3GPP TSG SA WG3 Security—SA3#67, S3-120385, May 21-25, 2012, 3 pages.

* cited by examiner

Fig. 1 (PRIOR ART)

| CPI | CPL | CHI | CHL | SPI | Kic | KID | TAR | CNTR | PCNTR | RC/CC/DS | Secured Data with Padding |
|---|---|---|---|---|---|---|---|---|---|---|---|
| | Note 3 | | Note 3 | Note 2 | Note 2 | Note 2 | Note 2 | Note 1 | Note 1 | Note 1 | |
| | | | | | | | | Note 2 | Note 2 | | Note 2 |

NOTE 1: These fields are included in the data to be ciphered if ciphering is indicated in the Security Header.
NOTE 2: These fields are included in the calculation of the RC/CC/DS.
NOTE 3: Part or all of these fields may also be included in the calculation of the RC/CC/DS, depending on implementation (e.g. SMS).

METHOD TO DETECT AN OTA (OVER THE AIR) STANDARD MESSAGE AFFECTED BY AN ERROR

CROSS-REFERENCE TO RELATED APPLICATIONS

This application is a continuation of U.S. patent application Ser. No. 14/524,132, filed on Oct. 27, 2014, and entitled "Method to Detect an OTA (Over the Air) Standard Message Affected by an Error," which application claims the benefit of Italian Patent Application No. MI2013A001824, filed on Nov. 4, 2013, which applications are hereby incorporated herein by reference.

TECHNICAL FIELD

The present disclosure refers to a method to detect a message compatible with the OTA standard (Over The Air) and affected by an error. The disclosure also refers to a system implementing the method.

BACKGROUND

In particular, the disclosure refers to a method of the type above mentioned to improve security in wireless transmissions that involve secure electronic devices, such as integrated circuit cards (IC Cards).

Methods are known to detect a message compatible with the OTA standard (Over The Air) and affected by an error. One of these methods, known as checksum, includes summing up all the bits of a message and in storing the resultant value in the same message, before its transmission. After receiving the message, the same sum calculation is implemented and the resultant value is compared with the stored value in the message. If the two values do not correspond, an error is detected.

In the presence of a wrong checksum, a receiving device may return a generic error to a sender device or ask for the retransmission of the message. The error is generic because the checksum does not allow returning to the cause which has determined the different value of the sum before and after the transmission.

The known methods are not able to detect if the OTA message is affected by a specific error, and in particular by a cryptographic error. On the contrary, the response given by the receiving device to an OTA message affected by a cryptographic error may supply information that compromises its security.

For this reason, the sender device may be a hacker which intentionally sends an OTA message affected by wrong or incorrect cryptography, i.e. using a wrong cryptographic key, for analyzing the generic error response of the receiving device and gleaning information therefrom.

In particular, in the field of telecommunication applications (GSM, UMTS, 3GPP2, LTE, etc.), a way to attack an integrated circuit card (IC Card, SIM, USIM, UICC, R-UIM), includes sending to the card an OTA message using a false cryptographic key. The information sent to the card in response to the OTA message may be used to return to the cryptographic key of card.

To understand this better, it is worthwhile observing that, according to the OTA protocol, some information can be encrypted in the message to send through a symmetric key cryptographic algorithm, such as the DES, 3DES, AES algorithms.

Once the OTA message is received and deciphered, the receiving device can verify the authenticity, the correctness and the integrity of the received data. For this purpose, in accordance with the OTA standard, three control modes are considered, mutually exclusive, based on variable size field within the OTA packet. They are known as Cryptographic Checksum, Digital Signature and Redundancy Check.

However, even if the methods represent a valid approach to the integrity and authenticity control of the received data, they may not be able to distinguish the event wherein the OTA message received has been ciphered with a wrong or incorrect key (for example in case of a hacker attack) from the event wherein errors have occurred, such as errors due to interference.

Moreover, according to the OTA standard, usage of the control modes is nonobligatory. Indeed, the transmission of OTA messages without Cryptographic Checksum, Digital Signature and Redundancy Check is common practice, because it accelerates the communication, even if it prevents implementing the controls.

In other words, the ciphering error is not adequately processed by the receiving device that works according to the OTA standard, which may answer sending considerable information, that could allow a hacker to detect the ciphering key of the receiving device.

The technical problem at the base of the present disclosure is to determine a method to detect a message compatible with the OTA standard and affected specifically by an incorrect cryptography, both in the case that the OTA message comprises the optional values of Cryptographic Checksum or Digital Signature or Redundancy Check, and in the case wherein the values are omitted, as optional, allowing therefore the receiving device to implement a countermeasure to a possible attack based on an intentional incorrect cryptography and riding out the limitations which even now affect the known methods.

SUMMARY

The present disclosure is therefore directed to an effective and efficient method to detect messages affected by wrong or incorrect ciphering, in order to make more secure the communication between a secure electronic device and any other electronic sender device and to defend the secure electronic device against a possible hacker attack.

The present disclosure is also directed to realizing a particular state message, that does not contain considerable information or from which it may be possible to go back to the ciphering key of the secure electronic device, and that inform the sender device about the presence of messages affected by incorrect ciphering.

The technical problem are addressed by a method according to the present disclosure, comprising the steps of receiving a ciphered OTA message, deciphering the OTA message received and reading a counter field (PCNTR) of padding bytes and the corresponding padding bytes in the message deciphered. The ciphering error is identified by detecting a value of the counter field (PCNTR) or a value in the padding bytes incongruent with the OTA standard or incongruent with a cryptographic algorithm used for the deciphering.

According to one aspect, the method detects at least one bit 1 in at least one of the padding bytes of the deciphered OTA message come indicative value of the incorrect ciphering.

According to another aspect, the method detects a counter field that does not belong to a preset interval of the cryptographic algorithm, as indicative value of the incorrect ciphering. In one embodiment, the cryptographic algorithm is the DES algorithm or AES and the interval is, respectively, [0 . . . 7] or [0 . . . 15].

According to another aspect, the ciphered OTA message is received by a secure electronic device, comprising a ciphering key for deciphering the OTA message.

In the following description, the expressions secure electronic device or receiving device are used synonymously to indicate the device of which is wanted protection of the cryptographic key, i.e. the device that implements the method according to the present disclosure.

The secure electronic device may comprise an integrated circuit card (IC Card), for example, a SIM, USIM, UICC or R-UIM card.

According to one embodiment, the secure electronic device does not send any message or error code in response to the OTA message affected by incorrect ciphering, to not supply any useful information to a sender device of the OTA message.

According to another embodiment, the secure electronic device sends a message or error code in response to the OTA message affected by incorrect ciphering, but the message or error code is different from others messages of error, for example, from messages of a wrong checksum.

The ciphered OTA message is received by a secure electronic device as an integrated circuit card (IC Card) comprising receiving and deciphering means or a reading and deciphering circuit of the ciphered OTA message, reading means or a reading circuit of the counter field of padding bytes and of the corresponding padding bytes, and detecting means or a detector circuit of a value of the counter field (PCNTR) or of a value in the padding bytes incongruent with the OTA standard or incongruent with a cryptographic algorithm used for the deciphering.

The technical problem is also addressed by the OTA (Over The Air) communication protocol modified to allow the detecting of a message potentially affected by a incorrect ciphering. The protocol modified is characterized by the fact of allowing the reading of a counter field (PCNTR) of padding bytes in an OTA message already deciphered and the reading of a number of padding bytes in the OTA message already deciphered corresponding to the counter field; and the detecting of a value of the counter field (PCNTR) or of a value in the padding bytes incongruent with the OTA standard or incongruent with a cryptographic algorithm used for the deciphering. The incongruent value is indicative of the incorrect ciphering.

BRIEF DESCRIPTION OF THE DRAWINGS

These and other features of the present disclosure will appear clear through the following description, shown by way of example and not limitative, in reference to the attached drawings.

FIG. 1 is a schematic diagram of a message or OTA Command Packet, according to the prior art.

DETAILED DESCRIPTION

Figure 2:
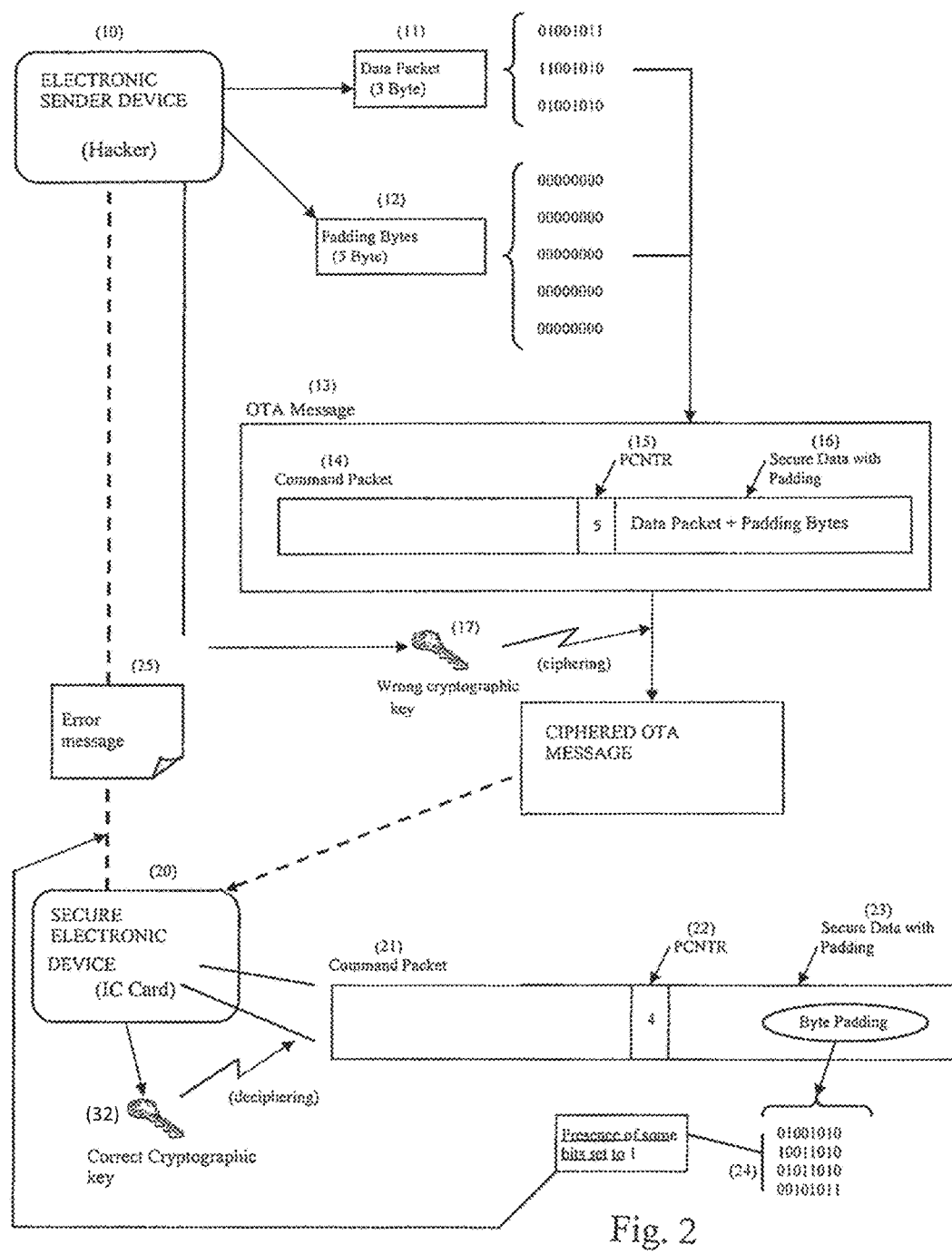
FIG. 2 is a block diagram representative of the method according to the present disclosure.

Now described is a method to detect an incorrect or wrong ciphering in a message compatible with the OTA standard, according to the present disclosure. The method comprises receiving an OTA message in a receiving device, also indicated as a secure electronic device. The OTA message is sent, for example, by an OTA server as sender device, for the updating of an operating system or of an application stored in the secure electronic device. The latter comprises, for example, an integrated circuit card (IC Card).

The OTA message is a Command Packet with a plurality of fields, among which is a counter field of padding bytes (PCNTR) and a secured data field with padding. The counter field stores a value equal to the number of padding bytes present in the secured data field with padding. The latter, according to the OTA standard, have all the bits with a value equal to zero.

The OTA server ciphers the OTA message to send using a cryptographic key equal to the one of the secure electronic device. It is also possible that the sender device is a hacking device, in that case the cryptographic key of the sender device is different from the one of the receiving device, and the OTA message is sent in the attempt to recover from the receiving device valuable information, useful for obtaining its cryptographic key.

Both the electronic devices (sender and receiving) exploit a cryptographic algorithm for the encryption and decryption of the messages, for example, the DES algorithm (Data Encryption Standard) or AES (Advanced Encryption Standard) algorithm.

The interval of possible values of the padding bytes counter depends on the algorithm used. In particular, in the DES algorithm, the secure data field with padding includes a number of bytes being a multiple of 8, whereas, in the AES algorithm, the number of bytes is a multiple of 16. Therefore, the padding bytes counter is included between 0 and 7 for the DES algorithm and is included between 0 and 15 for the AES algorithm.

The sender electronic device produces a data packet of generic length and, depending on the cryptographic algorithm used, adds a number of padding bytes to the secure data field with padding, to make it a multiple of 8 (in case of DES) or 16 (in case of AES). At this point, the sender electronic device encrypts the message with its cryptographic key and sends it.

Once the OTA message is received, the secure electronic device deciphers the messages received with its own cryptographic key and reads the content. In particular, the device accesses the counter field (PCNTR), reads the value and controls the congruence with the padding bytes present in the secure data field with padding.

A congruence check includes verifying that the number of padding bytes in the secure data field with padding, i.e. the number of bytes having all the bits set to 0, corresponds to the number indicated in the padding bytes counter PCNTR. Therefore, if the bits of each padding byte are set to zero, the integrity and the authenticity of the sender device are verified.

Differently, the OTA message is affected by a cryptographic error of a potential hacker that uses a wrong or incorrect key, i.e. different from the one of the receiving device, for ciphering the OTA message.

Another coherence check includes controlling that the number indicated in the padding bytes counter PCNTR is in a predetermined interval, in conformity with the cryptographic algorithm used. For example, in the case of a DES algorithm, a padding byte counter PCNTR with value out of the interval [0 . . . 7] is indicative of a cryptographic error. Therefore, the OTA message is affected by a cryptographic error generated by a potential hacker that uses a incorrect cryptographic key different from the one of the receiving device.

At the end of the above mentioned check, the secure electronic device may implement a security procedure, for example, sending to the sender device a cryptographic error message, being indicative of the incorrect ciphering and without including in the message useful information to return to the correct ciphering key, for example, generic error messages.

In order to render everything even clearer, an example of embodiment of the present disclosure is given hereunder, with reference to FIG. 2.

The sender electronic device 10 produces an OTA data message comprising a data packet 11 of length 3 bytes (n bytes); using, for example, the cryptographic DES algorithm, the sender device adds 5 bytes (8-n bytes) of padding 12 with all the bits set to 0, as expected from the OTA standard, for completing the secured data field with padding 16 of the OTA message 13 and sets to 5 (8-n) the counter field of padding PCNTR 15.

Later, the sender device encrypts the fields of the Command Packet 14 with its cryptographic key 17 and sends the message. The cryptographic key of the sender device, in the example of FIG. 2, is different from that of the receiving device, for example, a wrong or incorrect key.

Once the OTA message is received, the secure electronic device 20 decrypts the ciphered fields of the Command Packet 21. Using its own cryptographic key 32 for the decryption, the secure electronic device obtains numerical results different from those of the sender electronic device, since the two keys are different.

According to the example, the value in the counter field PCNTR 22 of the deciphered OTA message is no more 5 (8-n), but 4 (x); the secure electronic device reads the content of the secure data field with padding 23, and checks the presence of some bits set to 1 in the 4 (x) padding bytes 24. The presence of the bits set to 1 allows the receiving device to detect the message affected by incorrect ciphering and handle the event in an appropriate way, producing an error message 25 for the sender electronic device 10. It is also possible that, due to the different keys used by the sender device and the receiving device, a value y of the padding bytes counter does not belong to the interval [0 . . . 7], after the deciphering of the OTA message among the receiving device. For example, the value of the counter field after the deciphering may be 11, in case of DES algorithm or 23 in case of AES algorithm. Also in this case, the receiving device may detect the message affected by incorrect ciphering and implement a security procedure, for example, producing an error message 25 for the sender electronic device 10 or ignoring the OTA message received.

Advantageously, according to the method of the present disclosure, it is possible to recognize a cryptographic error in an OTA message from errors of different character, for example, from a transmission error of the message.

Profitably, a response of the receiving device in case of incorrect cryptography may be differentiated from a response in case of an error of a different or generic character, as in the error of a checksum. In particular, the receiving device may be programmed to send no information in response to an OTA message affected by a cryptographic error, to not supply any useful information to a possible hacking sender device.

Advantageously, the device may be programmed to answer with specific information of incorrect cryptography, through which the potential hacking sender device could not return to any useful or considerable information of the sender device.

What is claimed is:
1. A method, comprising:
receiving a ciphered message compatible with an Over The Air (OTA) standard, the ciphered message being encrypted using a first cryptographic key of a cryptographic algorithm comprising a Data Encryption Standard algorithm, the ciphered message comprising padding bytes set to a first bit value;
deciphering the ciphered message using a second cryptographic key of the cryptographic algorithm to produce a deciphered OTA message, the second cryptographic key being different from the first cryptographic key;
determining a number of padding bytes of the deciphered OTA message; and
determining an incorrect ciphering in response to at least one bit of the padding bytes of the deciphered OTA message being set to a second bit value different from the first bit value or in response to the number of padding bytes of the deciphered OTA message not being in a predetermined interval, wherein the predetermined interval comprises integers greater than or equal to 0 and less than or equal to 7.

2. The method of claim 1, wherein the deciphered OTA message comprises a counter field of padding bytes indicative of the number of padding bytes of the deciphered OTA message.

3. A method, comprising:
receiving a ciphered message, the ciphered message having been encrypted by a sender device using a first cryptographic key compatible with a cryptographic algorithm;
deciphering, using a second cryptographic key compatible with the cryptographic algorithm, the ciphered message, the deciphering producing a deciphered message comprising a data packet, padding bytes, and a counter field indicative of a number of the padding bytes of the deciphered message; and
determining that an incorrect ciphering has occurred in response to the counter field of the deciphered message having a value outside a numerical interval or in response to at least one bit of the padding bytes of the deciphered message being set to a first binary value, wherein the cryptographic algorithm comprises a Data Encryption Standard algorithm, and wherein the numerical interval comprises integers greater than or equal to 0 and less than or equal to 7.

4. The method of claim 3, wherein each of the ciphered message and the deciphered message is compatible with an Over The Air (OTA) standard.

5. The method of claim 3, wherein the ciphered message comprises padding bytes, each bit of the padding bytes of the ciphered message being set to a second binary value different from the first binary value.

6. The method of claim 5, wherein the first binary value comprises binary value 1 and the second binary value comprises binary value 0.

7. The method of claim 3, further comprising sending an error message indicative of a cryptographic error, the error message being devoid of information for generating the second cryptographic key.

8. The method of claim 3, wherein the ciphered message is received by a secure electronic device.

9. The method of claim 8, wherein the secure electronic device comprises an integrated circuit card.

10. The method of claim 3, further comprising authenticating the sender device in response to a determination that the incorrect ciphering has occurred.

11. An electronic device, comprising:
a receiving circuit configured to receive a ciphered message, the ciphered message having been encrypted by a sender device using a first cryptographic key compatible with a cryptographic algorithm;
a deciphering circuit configured to decipher, using a second cryptographic key compatible with the cryptographic algorithm, the ciphered message, the deciphering producing a deciphered message comprising a data packet, padding bytes, and a counter field indicative of a number of the padding bytes of the deciphered message; and
a detection circuit configured to detect that an incorrect ciphering has occurred in response to the counter field of the deciphered message having a value outside a numerical interval or in response to at least one bit of the padding bytes of the deciphered message being set to a first binary value, wherein the cryptographic algorithm comprises a Data Encryption Standard algorithm, and wherein the numerical interval comprises integers greater than or equal to 0 and less than or equal to 7.

12. The electronic device of claim 11, wherein the cryptographic algorithm is compatible with an Over The Air (OTA) standard.

13. The electronic device of claim 11, wherein the electronic device comprises an integrated circuit card.

14. The electronic device of claim 11, further comprising an authentication circuit configured to authenticate the sender device in response to a determination that the incorrect ciphering has occurred.

15. A method, comprising:
receiving a ciphered message compatible with an Over The Air (OTA) standard, the ciphered message being encrypted using a first cryptographic key of a cryptographic algorithm comprising an Advanced Encryption Standard algorithm, the ciphered message comprising padding bytes set to a first bit value;
deciphering the ciphered message using a second cryptographic key of the cryptographic algorithm to produce a deciphered OTA message, the second cryptographic key being different from the first cryptographic key;
determining a number of padding bytes of the deciphered OTA message; and
determining an incorrect ciphering in response to at least one bit of the padding bytes of the deciphered OTA message being set to a second bit value different from the first bit value or in response to the number of padding bytes of the deciphered OTA message not being in a predetermined interval, wherein the predetermined interval comprises integers greater than or equal to 0 and less than or equal to 15.

16. A method, comprising:
receiving a ciphered message, the ciphered message having been encrypted by a sender device using a first cryptographic key compatible with a cryptographic algorithm;
deciphering, using a second cryptographic key compatible with the cryptographic algorithm, the ciphered message, the deciphering producing a deciphered message comprising a data packet, padding bytes, and a counter field indicative of a number of the padding bytes of the deciphered message; and
determining that an incorrect ciphering has occurred in response to the counter field of the deciphered message having a value outside a numerical interval or in response to at least one bit of the padding bytes of the deciphered message being set to a first binary value, wherein the cryptographic algorithm comprises an Advanced Encryption Standard algorithm, and wherein the numerical interval comprises integers greater than or equal to 0 and less than or equal to 15.

17. The method of claim 16, wherein each of the ciphered message and the deciphered message is compatible with an Over The Air (OTA) standard.

18. The method of claim 16, wherein the ciphered message comprises padding bytes, each bit of the padding bytes of the ciphered message being set to a second binary value different from the first binary value.

19. The method of claim 18, wherein the first binary value comprises binary value 1 and the second binary value comprises binary value 0.

20. The method of claim 16, further comprising sending an error message indicative of a cryptographic error, the error message being devoid of information for generating the second cryptographic key.

21. The method of claim 16, wherein the ciphered message is received by an integrated circuit card.

* * * * *